United States Patent Office 3,555,026
Patented Jan. 12, 1971

3,555,026
HALOPYRIDAZONE DERIVATIVES
Franz Reicheneder, Ludwigshafen (Rhine), and Adolf
Fischer, Mutterstadt, Pfalz, Germany, assignors to
Badische Anilin- & Soda-Fabrik Aktiengesellschaft,
Ludwigshafen (Rhine), Germany
No Drawing. Continuation of application Ser. No.
598,224, Dec. 1, 1966. This application Sept. 11,
1969, Ser. No. 857,652
Claims priority, application Germany, Jan. 3, 1966,
B 85,240
Int. Cl. C07d 51/04
U.S. Cl. 260—250                                3 Claims

ABSTRACT OF THE DISCLOSURE

Pyridazones having the formula:

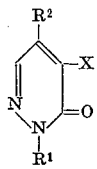

in which X denotes iodine, $R^1$ is phenyl, $R^2$ is —$OCH_3$ or is —$OCH_3$ or the group

in which $R^3$ is α-hydroxy-β,β,β-trichloroethyl. These compounds have been found to have excellent herbicidal activity.

---

This application is a continuation of application 598,224 filed Dec. 1, 1966.

The present invention relates to new pyridazone derivatives. In particular it relates to halopyridazone derivatives. The invention also relates to the control of unwanted plants with said derivatives.

We have found that pyridazones having the formula

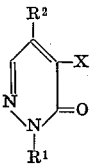

in which X denotes iodine $R^1$ is phenyl, $R^2$ is —$OCH_3$ or the group

in which $R^3$ is α-hydroxy-β,β,β-trichloroethyl.

The pyridazones to be used according to the present invention may be simply prepared by reacting the appropriate pyridazone substituted by iodine or fluorine with a nitrogenous compound. For example by reacting 1-phenyl-4,5-diiodopyridazone-6 with ammonia in a solution of methanol under pressure 1-phenyl-4-amino-5-iodopyridazone-6 may be obtained which, when reacted with acetyl chloride, yields 1-phenyl-4-acetylamino-5-iodopyridazone-6.

Since all the compounds according to this invention may be prepared by an analogous method, this process will now be described in more detail:

To prepare 1-phenyl-4,5-diiodopyridazone-6 34 parts (parts by weight) of 2,3-diiodobutene-(2)-diol-1,4 is dissolved in 250 parts of acetone. 135 parts of a solution of 100 parts of chromium trioxide, 160 parts of concentrated sulfuric acid and 500 parts of water are dripped into the acetone solution at room temperature. The reaction solution is stirred for two hours at 50° C. while cooling. After the acetone has been evaporated in vacuo the aqueous solution is extracted with ether. The ethereal extract is shaken out with a solution of sodium bicarbonate. The weakly alkaline aqueous solution is acidified with 2 N sulfuric acid and again extracted with ether. After the ether has been evaporated 4 parts of a residue is obtained which is dissolved in 10 parts of glacial acetic acid. 1.5 parts of phenylhydrazine dissolved in 10 parts of glacial acetic acid is added to the solution in glacial acetic acid and the mixture is boiled for five minutes under reflux, cooled and diluted with water. A dark product is obtained which is dissolved in benzene. This solution in benzene is chromatographed using an aluminum oxide column. After eluting with a 1:1 mixture of benzene and ethyl acetate the solvent mixture is evaporated and the residue is recrystallized from methanol. 0.9 part of 1-phenyl-4,5-diiodopyridazone-6 is obtained as a crystalline pale yellow substance with a melting point of 130° to 131° C.

10 parts of 1-phenyl-4,5-diiodopyridazone-6 is suspended in an aqueous solution of ammonia containing 20% by weight of ammonia and the suspension is stirred for six hours at 100° C. in a pressure vessel. It is then allowed to cool and is suction filtered. After drying, 6 parts of 1-phenyl-4-amino-5-iodopyridazone-6 is obtained with a melting point of 250° to 252° C. (crystallized from ethyl glycol).

8 parts of 1-phenyl-4-amino-5-iodopyridazone-6 is boiled for five minutes under reflux with 40 parts of acetoanhydride and 2 parts of concentrated sulfuric acid. After cooling, 4.6 parts of a substance crystallizes out which, after being recrystallized from alcohol melts at 198° to 200° C. If the mother liquor is poured onto ice a further 2.4 parts of this compound is obtained. The substance is 1-phenyl-4-acetylamino-5-iodopyridazone-6.

The other compounds to be used according to the invention may be obtained by analogous methods.

The following compounds are examples of suitable agents for regulating plant growth according to this invention:

| | M.P. ° C. |
|---|---|
| 1-phenyl-4-acetylamino-5-iodopyridazone-6 | 198 to 200 |
| 1-phenyl - 4 - chloroacetylamino-5-iodopyridazone-6 | 167 to 168 |
| 1 - phenyl - 4 - isocyanatoamine-5-iodopyridazone-6 | 105 to 110 |
| N-[4 - (1-phenyl-5-iodopyridazon-6)yl]oxamic acid | [1] 182 |
| N - [4 - (1-phenyl-5-iodopyridazon-6)-yl-]N'-dimethylformamidine | 205 to 207 |
| N - phenyl-N'-[(1-phenyl-5-iodopyridazon-6)-4-yl]urea | 224 to 226 |
| 1-phenyl-4-(α - hydroxy-β,β,β-trichloroethyl)-amino-5-iodopyridazone-6 | [1] 130 |
| 1-phenyl - 4 - (hydroxycarbomethoxymethyl)-amino-5-iodopyridazone-6 | 244 to 246 |
| 1-phenyl-4-methoxy-5-iodopyridazone-6 | 126 to 128 |
| 1-phenyl-4-thiomethyl-5-iodopyridazone-6 | 138 to 140 |
| 1 - cyclohexyl - 4 - acetylamino-5-iodopyridazone-6 | 139 to 141 |

[1] With decomposition.

The agents for regulating plant growth according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be preparerd from active ingredient, emulsifying or dispersing agent and possibly solvent. Compounds having adequate basicity may be used as salts in aqueous solution even after formation of the salt with acids.

Dusts may be prepared by mixing or grinding the active ingredients with a solid carrier.

The following comparative experiments demonstrate the superiority of the compositions according to this invention over known active ingredients.

EXAMPLE 1

In a greenhouse plastics pots with a diameter of 8 cm. are filled with loamy sandy soil and seeds of Indian corn (*Zea mays*), barley (*Hordeum vulgare*), cotton (Gossypium sp.), beans (*Phaseolus vulgaris*), white goosefoot (*Chenopodium album*), small nettle (*Urtica urens*), cleavers (*Galium aparine*), chamomile (*Matricaria chamomilla*), annual meadow grass (*Poa annua*) and slender foxtail (*Alopecurus myosuroides*) are sown therein. The soil prepared in this way is then sprayed with 1-phenyl-4-(α'-hydroxy - β',β',β' - trichloroethyl)-amino-5-iodopyridazone-6 (I), 1-phenyl-4-methoxy-5-iodopyridazone-6 (II) and, for comparison, with 1-phenyl-4-amino-5-chloropyridazone-6 (III), each at a rate of application of 2 kg./ha. of active ingredient dispersed in 500 liters of water per hectare. Four weeks later the following results are observed.

|  | Active ingredient | | |
|---|---|---|---|
|  | I | II | III |
| Crop plants: | | | |
| Indian corn | 0 | 0 | 10 |
| Barley | 0 | 0 | 20–30 |
| Cotton | 0–10 | 0 | 30 |
| Beans | 0 | 0 | 0–10 |
| Unwanted plants: | | | |
| White goosefoot | 90–100 | 90–100 | 80 |
| Small nettle | 100 | 90–100 | 80–90 |
| Cleavers | 80 | 80 | 50 |
| Chamomile | 90–100 | 90–100 | 80 |
| Annual meadow grass | 90–100 | 90 | 60 |
| Slender foxtail | 80 | 70–80 | 50 |

Note.—0=no damage; 100=total destruction.

EXAMPLE 2

The plants Indian corn (*Zea mays*), barley (*Hordeum vulgare*), wheat (*Triticum vulgare*), rice (*Oryza sativa*), henbit (*Lamium amplexicaule*), black bindweed (*Polygonum convolvulus*) groundsel (*Senecio vulgaris*), chamomile (*Matricaria chamomilla*), white goosefoot (*Chenopodium album*), annual meadow grass (*Poa annua*), slender foxtail (*Alopecurus myosuroides*) and barnyard grass (*Panicum crus galli*) are sprayed at a growth height of 3 to 15 cm. with 1-phenyl-4-(α'-hydroxy-β',β',β'-trichloroethyl)-amino-5-iodopyridazone-6 (I), 1-phenyl-4-methoxy-5-iodopyridazone-6 (II) and, for comparison, with 1-phenyl-4-amino-5-chloropyridazone-6 (III), each at a rate of application of 2 kg./ha. of active ingredient dispersed in 500 liters of water per hectare. Three to four weeks later the following results are observed:

|  | Active ingredient | | |
|---|---|---|---|
|  | I | II | III |
| Crop plants: | | | |
| Indian corn | 0 | 0 | 10 |
| Barley | 0–10 | 0–10 | 20–30 |
| Wheat | 1F | 10 | 30 |
| Rice | 0 | 0 | 10–20 |
| Unwanted plants: | | | |
| Henbit | 90–100 | 90–100 | 70–80 |
| Black bindweed | 90–100 | 90–100 | 70 |
| Groundsel | 90 | 90 | 50–60 |
| Chamomile | 90–100 | 90–100 | 80 |
| White goosefoot | 100 | 100 | 80 |
| Annual meadow grass | 90–100 | 90 | 60–70 |
| Slender foxtail | 80 | 70–80 | 40–50 |
| Barnyard grass | 70–80 | 70–80 | 30–40 |

Note.—0=no damage; 100=total destruction.

EXAMPLE 3

An agricultural cultivated area which is sown with seeds of wild mustard (*Sinapis arvensis*), white goosefoot (*Chenopodium album*), small nettle (*Urtica urens*), gallant soldier (*Galinsoga parviflora*), amaranth pigweed (*Amarantus retroflexus*), henbit (*Lamium amplexicaule*), chamomile (*Matricaria chamomilla*), cleavers, (*Galium aparine*), annual meadow grass (*Poa annua*), slender foxtail (*Alopecurus myosuroides*) and silky bent grass (*Apera spica venti*) is treated on the same day with 1-phenyl-4-(α'-hydroxy-β',β',β'-trichloroethyl) - amino-5-iodopyridazone-6 (I), 1-phenyl-4-methoxy-5-iodopyridazone-6 (II) and, for comparison, with 2-chloro-4,6-bis-(ethylamino)-s-triazine (II). The rate of application in each case is 5 kg./ha. of active ingredient dispersed in 500 liters of water per hectare. After the broadleaved and grass weeds have emerged it can be observed that compounds I and II have a stronger initial herbicidal action than III.

EXAMPLE 4

An agricultural cultivated area which is overgrown with wild mustard (*Sinapis arvensis*), white groosefoot (*Chenopodium album*), small nettle (*Urtica urens*), gallant soldier (*Galinsoga parviflora*), amaranth pigweed (*Amarantus retroflexus*), henbit (*Lamium amplexicaule*), chamomile (*Matricaria chamomilla*), cleavers (*Galium aparine*), annual meadow grass (*Poa annua*), slender foxtail (*Alopecurus myosuroides*) and silky bent grass (*Apera spica venti*) is treated at a growth height of the plants of 5 to 8 cm. with 1-phenyl-4-(α'-hydroxy-β',β',β'-trichloroethyl)-amino-5-iodopyridazone-6 (I), 1-phenyl-4-methoxy-5-iodopyridazone-6 (II) and, for comparison, with 2-chloro-4,6-bis-(ethylamino)-s-triazine (III). The rate of application in each case is 5 kg./ha. of active ingredient dispersed in 500 liters of water per hectare. Eight to ten days later it can be observed that compounds I and II have a considerably stronger initial herbicidal action than III.

The following have the same biological action as compounds I and II in Examples 1, 2, 3 and 4:

1-phenyl-4-hydrazino-5-iodopyridazone-6
1-phenyl-4-chloroacetylamino-5-iodopyridazone-6
1-phenyl-4-acetylamino-5-iodopyridazone-6
1-phenyl-4-isobutyrylamino-5-iodopyridazone-6
1-phenyl-4-diacetylamino-5-iodopyridazone-6
1-phenyl-4-formylamino-5-iodopyridazone-6
N-[4-(1-phenyl-5-iodopyridazon-6)-yl]oxamic acid
N-[4-(1-phenyl-5-iodopyridazon-6)-yl]succinamic acid
Sodium N-[4-(1-phenyl-5-iodopyridazon-6)-yl]oxamate
N-[4-(1-phenyl-5-iodopyridazon-6)-yl]maleic acid
Potassium N-[4-(1-phenyl-5-iodopyridazon-6)-yl]maleate
N-[4-(1-phenyl-5-iodopyridazon-6)-yl]succinimide
N-[4-(1-phenyl-5-iodopyridazon-6)-yl]maleimide
bis N-[4-(1-phenyl-5-iodopyridazon-6)-yl]oxamide
N-[4-(1-phenyl-5-iodopyridazon-6)-yl]N'-dimethylformamidine N-[4-(1-phenyl-5-iodopyridazon-6)-yl]N'-methyl-
   formamidine
1-phenyl-4-thiomethyl-5-iodopyridazone-6
1-phenyl-4-sulfynylamino-5-iodopyridazone-6
1-phenyl-4-isocyanato-5-iodopyridazone-6
N-phenyl-N'-[(1-phenyl-5-iodopyridazon-6)-4-yl]urea
N-p-chlorophenyl-N'-[(1-phenyl-5-iodopyridazon-6)-
   4-yl]urea
1-p-trifluoromethylphenyl-4-acetylamino-5-iodopyrid-
   azone-6
1-p-chlorophenyl-4-acetylamino-5-iodopyridazone-6
1-p-bromophenyl-4-acetylamino-5-iodopyridazone-6
1-m-methylphenyl-4-acetylamino-5-iodopyridazone-6
1-cyclopentyl-4-acetylamino-5-iodopyridazone-6
1-cyclooctyl-5-acetylamino-5-iodopyridazone-6
1-phenyl-4-azido-5-iodopyridazone-6
1-phenyl-4-chloroacetylamino-5-fluoropyridazone-6
1-cyclohexyl-4-(α'-hydroxy-β'-β',β'-trichloroethyl)-
   amino-5-iodopyridazone-6
N-[4-(cyclohexyl-5-iodopyridazon-6)-yl]oxamic acid
1-cyclohexyl-4-acetylamino-5-iodopyridazone-6
1-methylcyclohexyl-4-acetylamino-5-iodopyridazone-6
1-phenyl-4-nitro-5-iodopyridazone-6
1-phenyl-4-hydroxyl-5-iodopyridazone-6
1-phenyl-4-o-acetyl-5-iodopyridazone-6
1-phenyl-4-amino-α-hydroxyacetic acid methyl ester-5-
   iodopyridazone-6
N-dimethyl-N'-[(1-phenyl-5-iodopyridazon-6)-yl-
   4]urea
N-methyl-N-methoxy-N'-[(1-phenyl-5-iodopyridazon-
   6)-yl-4]urea
N-methyl-N-butyn-1'-yl-3'-N'-[(1-phenyl-5-iodo-
   pyridazon-6)-yl-4]urea.

What is claimed is:
1. A compound having the formula

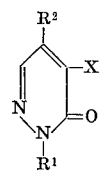

in which X is iodine, $R^1$ is phenyl, $R^2$ is —$OCH_3$ or the group

in which $R^3$ is α-hydroxy-β,β,β-trichloroethyl and $R^4$ is hydrogen.

2. 1 - phenyl - 4 - (α-hydroxy-β,β,β-trichloroethyl)-amino-5-iodopyridazone-6.

3. 1-phenyl-4-methoxy-5-iodopyridazone-6.

References Cited
UNITED STATES PATENTS 3,210,353  10/1965  Reicheneder et al. __ 260—250A
3,222,159  12/1965  Reicheneder et al. __ 260—250A
3,287,105  11/1966  Reicheneder et al. __ 260—250A NICHOLAS S. RIZZO, Primary Examiner U.S. Cl. X.R.
71—92